United States Patent
Stehle (10) Patent No.: US 11,133,142 B2
(45) Date of Patent: Sep. 28, 2021

(54) POWER SWITCH

(71) Applicant: Siemens Aktiengesellschaft, Munich (DE)

(72) Inventor: Michael Stehle, Postbauer-Heng (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 190 days.

(21) Appl. No.: 16/495,849

(22) PCT Filed: Dec. 19, 2017

(86) PCT No.: PCT/EP2017/083466
§ 371 (c)(1),
(2) Date: Sep. 20, 2019

(87) PCT Pub. No.: WO2018/171926
PCT Pub. Date: Sep. 27, 2018

(65) Prior Publication Data
US 2020/0051767 A1    Feb. 13, 2020

(30) Foreign Application Priority Data
Mar. 24, 2017   (DE) ..................... 10 2017 205 004.7

(51) Int. Cl.
*H02H 3/08*   (2006.01)
*H02H 9/02*   (2006.01)
(Continued)

(52) U.S. Cl.
CPC ........... *H01H 71/125* (2013.01); *H01F 27/36* (2013.01); *H01F 27/42* (2013.01); *H02H 1/0007* (2013.01); *H02H 3/08* (2013.01); *H02H 9/02* (2013.01)

(58) Field of Classification Search
CPC .................................. H02H 3/08; H02H 9/02
(Continued)

(56) References Cited

U.S. PATENT DOCUMENTS

| 2,607,029 A | 8/1952 | Kesselring |
| 5,635,890 A | 6/1997 | Yamaguchi et al. |

(Continued)

FOREIGN PATENT DOCUMENTS

| CN | 2209400 Y | 10/1995 |
| CN | 1134028 A | 10/1996 |

(Continued)

OTHER PUBLICATIONS

Chinese Office Action and English translation thereof dated Jan. 6, 2021.

(Continued)

*Primary Examiner* — Gary A Nash
(74) *Attorney, Agent, or Firm* — Harness, Dickey & Pierce, P.L.C.

(57) ABSTRACT

A circuit breaker is for interrupting an electric current circuit when current and/or current time period thresholds are exceeded. The circuit breaker includes at least one control unit, to which energy is supplied by an energy converter. A primary winding of the energy converter is formed by a conductor of the electric current circuit. The core of the energy conductor surrounding the electric current circuit conductor is used as the primary winding. A secondary winding surrounds a section of the core. The secondary winding additionally surrounds an inductor core, arranged relative to the core using an insulating spacer element. The secondary winding and the inductor core are at least party magnetically shielded from the primary winding by a shielding plate guided through the core.

23 Claims, 4 Drawing Sheets

(51) Int. Cl.
*H01H 71/12* (2006.01)
*H01F 27/42* (2006.01)
*H02H 1/00* (2006.01)
*H01F 27/36* (2006.01)

(58) Field of Classification Search
USPC ............. 361/5, 41, 100–102, 115; 363/56.03
See application file for complete search history.

(56) References Cited

U.S. PATENT DOCUMENTS

| | | | | |
|---|---|---|---|---|
| 5,923,514 | A * | 7/1999 | Scott | H02H 1/0007 361/93.5 |
| 6,400,547 | B1 * | 6/2002 | Pohl | H01H 9/167 361/115 |
| 6,665,591 | B1 * | 12/2003 | Griepentrog | H02H 3/08 324/500 |
| 7,830,238 | B2 * | 11/2010 | Rajabhau | H01F 3/10 336/221 |
| 2003/0202305 | A1 | 10/2003 | Engel et al. | |
| 2010/0308857 | A1 | 12/2010 | Saniter et al. | |
| 2011/0058300 | A1 * | 3/2011 | Krauss | H02H 3/083 361/115 |
| 2011/0115449 | A1 * | 5/2011 | Schluter | H02M 1/36 323/238 |
| 2015/0009601 | A1 | 1/2015 | Broquie et al. | |
| 2016/0118175 | A1 | 4/2016 | Fischer et al. | |
| 2017/0054378 | A1 | 2/2017 | Njiende T. et al. | |

FOREIGN PATENT DOCUMENTS

| | | |
|---|---|---|
| CN | 1710676 A | 12/2005 |
| CN | 101871996 A | 10/2010 |
| CN | 202905642 U | 4/2013 |
| CN | 104283187 A | 1/2015 |
| CN | 204558406 U | 8/2015 |
| CN | 105308695 A | 2/2016 |
| CN | 106533130 A | 3/2017 |
| DE | 1538014 A1 | 5/1969 |
| DE | 3125145 A1 | 1/1983 |
| DE | 19634440 A1 | 3/1998 |
| DE | 19822515 A1 | 12/1999 |
| DE | 60306661 T2 | 11/2006 |
| DE | 602006000237 T2 | 4/2008 |
| EP | 0563606 A3 | 12/1994 |
| EP | 1693943 A2 | 8/2006 |
| GB | 630586 A | 10/1949 |
| WO | WO 9609639 A1 | 3/1996 |

OTHER PUBLICATIONS

International Search Report PCT/ISA/210 for International Application No. PCT/EP2017/083466 dated Apr. 16, 2018.
Written Opinion of the International Searching Authority PCT/ISA/237 for International Application No. PCT/EP2017/083466 dated Apr. 16, 2018.
German Search Report for German Application No. 102017205004.7 dated Jan. 25, 2018.

* cited by examiner

POWER SWITCH

PRIORITY STATEMENT

This application is the national phase under 35 U.S.C. § 371 of PCT International Application No. PCT/EP2017/083466, which has an International filing date of Dec. 19, 2017, which designated the United States of America, and which claims priority to German Patent Application No. DE 102017205004.7 filed Mar. 24, 2017, the entire contents of which are hereby incorporated herein by reference.

FIELD

Embodiments of invention relate to a circuit breaker.

BACKGROUND

Circuit breakers are protective devices which function in a similar manner to a fuse. Circuit breakers monitor the current flux which is conducted therein by way of a conductor, and interrupt the electric current or the energy flux to an energy sink or a load, described as tripping, if protection parameters such as current thresholds or current time period thresholds, i.e. the presence of a current value for a given period of time, are exceeded. Interruption is executed, for example, by way of contacts on the circuit breaker, which are opened.

Specifically for low-voltage power circuits or networks, depending upon the magnitude of the electric current provided in the electric circuit, various types of circuit breakers are available. Circuit breakers within the meaning of the invention are specifically switches of the type employed in low-voltage installations for currents from 63 to 6,300 amperes. More specifically, closed circuit breakers are employed for currents from 63 to 1,600 amperes, specifically from 125 to 630 or 1,200 amperes. Open circuit breakers are specifically employed for currents from 630 to 6,300 amperes, more specifically from 1,200 to 6,300 amperes.

Open circuit breakers are also described as air circuit-breakers, or ACBs for short, and closed circuit breakers as molded case circuit-breakers or compact circuit breakers, or MCCBs for short.

A low voltage specifically refers to voltages up to 1,000 volts AC or 1,500 volts DC.

Circuit breakers within the meaning of embodiments of the invention are specifically circuit breakers having a control unit, such as an electronic trip unit, or ETU for short. The control unit monitors the magnitude of the electric current measured by sensors, such as Rogowski coils, or additionally, in an analogous manner, the voltage and/or other parameters on the electric circuit, and executes an interruption of the electric circuit. For the operation of the control unit, electrical energy is required, which is supplied by an energy converter, for example a transformer. This is connected on the primary side to the electric circuit to be protected, and on the secondary side to the control unit.

In the event of a "high" current flux, circuit breakers interrupt the power circuit, in accordance with their protection parameters or operating values. The protection parameters or operating values are essentially the magnitude of current and/or the magnitude of current and the time after which a power circuit is to be interrupted in response to a sustained "high" current flux. By way of distinction from a fuse, these protection parameters or operating values can be adjusted on a circuit breaker, for example by way of a control unit, such as an electronic trip unit.

Energy converters are employed for the "standalone energy supply" of circuit breakers. They are based upon the principle of magnetically coupled power transmission, wherein energy for the control unit, such as an electronic trip unit, is supplied.

In many cases, a conductor of the electric power circuit constitutes the primary side of the energy converter. This means that, for example, the electrical conductor is the primary coil of the energy converter.

Problematically, these converters are associated with high primary currents, which induce a correspondingly high secondary current (by the transformer principle). High primary currents of this type can specifically occur in the event of high load currents or short-circuit currents. As a consequence, the apparent power of the current converter is exceeded. The energy converter thus assumes a state of magnetic saturation.

The apparent power in the current converter rises in a linear relationship with the primary current amplitude and the network frequency. This results in a minimum primary current, which is required to fulfill the secondary-side power demand of the control unit or ETU. This minimum primary current is dictated by the requirements of the application, and thus establishes the magnetic dimensioning of the ferromagnetic core in the energy converter or current converter (specifically the selection of material and the magnetic core length and cross-section). Essentially, this gives rise to a minimum magnetic cross-section A for a magnetic working point B, which is deduced from a requisite secondary voltage U at the network frequency f. This is described by the known transformation equation:

$$U = 4.4 * N2 * \cdot A * B * f$$

The secondary voltage I2 is given by the turn ratio N2 of the number of turns on the secondary winding to the primary current I1, wherein the requisite magnetization current Iµ for the generation of the magnetic flux should be deducted from the primary current.

$$I2 = (I1 - I\mu)/N2$$

The product of the two secondary variables defines the apparent power of the current converter Ps=U*I2. If this apparent power is smaller than the secondary-side power consumption, the magnetic core assumes a saturated state, as the magnetic flux density is limited by the core material.

Above the minimum primary current, the apparent power is driven upwards by the primary current amplitude. Under all operating conditions, however, the power consumption of the electronics remains substantially constant, thus giving rise to the above-mentioned mismatch between the source (the energy converter or current converter) and the sink (the control unit or ETU). The surplus power is converted into heat in the input voltage controller and/or in the secondary winding. This heat must be evacuated, or a critical internal heat-up will otherwise occur in the control unit and/or in the energy converter.

At present, energy converters like current converters are employed in circuit breakers which operate at up to approximately 200% of the specified primary current, in the linear region.

SUMMARY

At least one embodiment of the present invention is directed to improvement of a circuit breaker, specifically by the reduction of the apparent power or heat-up thereof.

Embodiments of the present invention are directed to a circuit breaker, an energy converter and an inductor for a circuit breaker.

At least one embodiment of the invention is directed to a circuit breaker for interrupting an electric power circuit when at least one of current and current time period thresholds are exceeded, the circuit breaker comprising:

at least one control unit, energy being supplied to the at least one control unit via an energy converter;
- a primary winding of the energy converter being constituted by a conductor of the electric power circuit,
- a core of the energy converter enclosing the conductor of the electric power circuit, to function as a primary winding, and
- a secondary winding of the energy converter enclosing a section of the core and additionally enclosing an inductor core, arranged relative to the core via an insulating spacer element, wherein the secondary winding and the inductor core are at least partially magnetically shielded from the primary winding by a shielding plate, routed through the core.

At least one embodiment of the invention is directed to n energy converter for a circuit breaker.

At least one embodiment of the invention is directed to an inductor for a circuit breaker.

BRIEF DESCRIPTION OF DRAWINGS

The described properties, characteristics and advantages of embodiments of the present invention, and the manner in which these are achieved, are clarified and elucidated in conjunction with the following description of exemplary embodiments, which are explained in greater detail with reference to the drawings.

In the drawings.

DETAILED DESCRIPTION OF THE EXAMPLE EMBODIMENTS

According to at least one embodiment of the invention, the mismatch is compensated by the incorporation of a current-limiting inductor, as the reactance of this inductor also increases with the secondary current amplitude and frequency. The apparent power of the energy converter or transformer is dictated by the primary current. The energy converter or transformer operates with no fixed phase relationship between current and voltage on the secondary side. Consequently, the take-up of active power is not absolutely necessary. If a reactance is additionally incorporated in series, the apparent power of the transformer can be compensated by the reactive capacity on this impedance. To this end, an inductor is interpolated between the energy converter and the control unit. In this case, the occurrence of high voltage spikes between the energy or current converter and the inductor, from which a hazard potential can proceed in the event of very rapid variations in the primary current (of high amplitude or frequency), must be considered. According to the invention, a specific magnetic concept is proposed, wherein the energy converter and the down-circuit current-limiting inductor are combined in an overall magnetic module.

This provides a particular advantage, in that a compact form of execution is made available for a current-limiting energy converter, specifically for the supply of energy to a control unit of a circuit breaker.

Advantageous configuration embodiments are disclosed in the claims.

In one advantageous configuration embodiment, the shielding plate partially encloses the secondary winding and the inductor core. The shielding plate is specifically configured as a U-shaped profile section or plate.

This has a particular advantage, in that the functionality of the inductor is maintained up to the region of maximum primary short-circuit currents.

In one advantageous configuration embodiment, the inductor core incorporates a central opening, through which the turns of the secondary winding, at least in part or in full, are routed. For example, the inductor core is configured as an annular core or a rectangular core with a corresponding opening. This provides a particular advantage, in that an effective layout of the inductor can be executed, and the magnetic flux concentrated in the core.

In one advantageous configuration embodiment, the inductor core is configured as a two-part or multi-part core. For example, two U-shaped, C-shaped or other cores are combined. Alternatively, a U-I core combination is also possible.

These cores can specifically be held together by clamping device(s).

This provides the advantage of easy assembly.

In one advantageous configuration embodiment, the inductor core is arranged parallel to the primary winding and/or perpendicularly to the core. This specifically signifies, firstly, a perpendicular arrangement, i.e. at right-angles to each other, of the primary planes of the core of the energy converter and the inductor core. The primary plane specifically signifies the plane of the largest surface of the core.

Secondly, specifically, a parallel arrangement of the inductor core to the primary winding, specifically to the primary conductor, signifies the parallel orientation of the primary plane of the inductor core to the longitudinal direction of the primary conductor, specifically to the primary plane of the primary conductor.

This provides a particular advantage, in that the magnetic field of the primary conductor acts uniformly on the inductor core. Secondly, the (residual) magnetic fields of the core and the inductor core are oriented perpendicularly to each other, and the reciprocal influence thereof is minimized.

In one advantageous configuration embodiment, the secondary winding comprises a first and a second winding. Specifically, these are spatially separated from one another. Specifically, these are arranged on first and second coil formers. This provides a particular advantage, in that the secondary-side quantity of energy on the energy converter and the further current-limited action of the inductor can be adjusted separately by way of the first winding and the second winding, respectively. A compact design is advantageously achieved.

In one advantageous configuration embodiment, the second winding encloses a second region of the inductor core, which is further removed from the core than the region of the first winding.

This provides a particular advantage, in that the influence of the core upon the second winding is minimized, as a result of which a superior variability of the current-limiting action is achieved.

In one advantageous configuration embodiment, the winding direction of the second winding is a continuation of the winding direction of the first winding of the secondary winding along the magnetic core length of the inductor core. Specifically, the magnetic fluxes of the first and second winding in the inductor core are structurally superimposed as a result.

This provides a particular advantage, in that a higher overall number of turns or inductance is achieved in the inductor, together with the optimized dimensioning of the overall design.

In one advantageous configuration embodiment, the energy converter comprises a core and/or the inductor comprises an inductor core in which:

a) the remanent flux density (Br2) is less than 30% or less than 20% of the saturation flux density (Bs2), or b) the coercive field strength (Hc2) is less than 10 A/m or less than 5 A/m.

Alternatively, the energy converter comprises a core (10), the saturation flux density (Bs2) of which is at least 1 T, and is specifically at least 1.2 T.

Alternatively, the energy converter comprises a ferromagnetic core of a nanocrystalline material, specifically a nanocrystalline strip-wound core.

This provides a particular advantage, in that a high permeability under low activation conditions, or a narrow hysteresis for the minimization of magnetic reversal losses is achieved.

In one advantageous configuration embodiment, the inductor core is at least partially constituted of a ferromagnetic powder, specifically of a Fe-, Fe/Ni-alloy or ferrite powder.

This provides a particular advantage, in that an effective inductor action is achieved.

In one advantageous configuration embodiment, the shielding plate is comprised of the elements Fe, Ni or Co, or is specifically an alloy containing at least one of the above-mentioned elements.

This provides a particular advantage, in that the magnetic field strength of the primary conductor in the region of the inductor core is significantly reduced, such that less additional power is induced in the inductor core or the secondary circuit.

In one advantageous configuration embodiment, the spacer element is electrically insulating. Specifically, it is comprised of a type of plastic, ceramic, glass or laminated paper/card.

This provides a particular advantage, in that Eddy currents or a stray magnetic flux between the core and the inductor core is minimized, specifically if the primary magnetic fluxes of both cores are oriented perpendicularly to one another.

In one advantageous configuration embodiment, the inductor core incorporates an air gap. Specifically, the inductor core can be constituted of a highly-permeable material. Specifically, it can be constituted in one part, two parts or multiple parts. At least one air gap is provided. A material can be inserted in the air gap, such as an insulating and/or a non-magnetic material.

This provides a particular advantage, in that a further option is provided for the adjustment of the inductance of the inductor by the selection of the ratio of the length of the magnetic inductor core to the width of the air gap. Preferably, materials with low magnetic core losses can be employed for the inductor core.

All configuration embodiments, both in their dependent form with reference to the claims, and with reference to only individual characteristics or combinations of characteristics from the patent claims, constitute an improvement of a circuit breaker.

Figure 1:
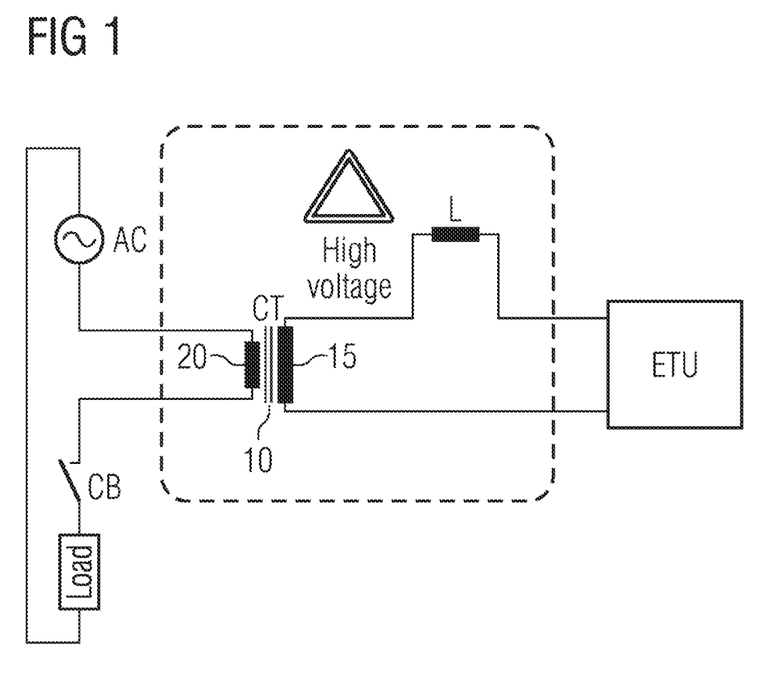
FIG. 1 shows a first circuit diagram of an inductor according to an embodiment of the invention, FIG. 2 (2a, 2b, 2c) shows a first configuration of an energy converter with an inductor, FIG. 3 (3a, 3b, 3c) shows a second configuration of an energy converter with an inductor.

FIG. 1 shows a first circuit diagram for the elucidation of an embodiment of the invention. An AC voltage source AC, functioning as an energy source, supplies an energy consumer Load, which functions as an energy sink. A conductor in the power circuit constitutes the primary side 20 of an energy converter CT. The conductor can constitute a plurality of windings of a primary coil of the energy converter CT. However, it is also possible for the conductor (with no turns) only to be routed precisely through or past a core 10 of the energy converter CT.

The core 10 of the energy converter CT further comprises a secondary side 15, which is constituted by one or more turns of a secondary winding or coil 15. The two terminals of the secondary winding 15 constitute the secondary side output of the energy converter CT, which delivers an energy supply for the two inputs of the at least one control unit ETU of the circuit breaker, which is not represented in greater detail. The circuit breaker further comprises at least one contact CB, by which the (primary) electric power circuit can be interrupted.

One output is electrically connected to an input in each case.

According to an embodiment of the invention, an inductor L is arranged in at least one connection between an output and an input.

Correspondingly occurring voltages are thus to be observed, which are described by the term high voltage.

Specifically in the event of very rapid variations in the primary current (of high amplitude or frequency), high voltage spikes occur between the current converter and the inductor, which are associated with a hazard potential.

Figure 2A:
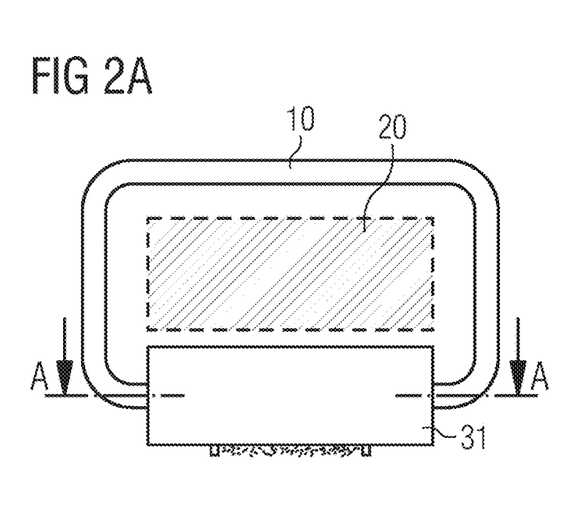

FIG. 2 shows an arrangement of an energy converter according to an embodiment of the invention, with an inductor. FIG. 2a shows an annular or rectangular core 10 of the energy converter CT. This encloses the primary conductor 20, which functions as a primary winding of the energy converter CT. In a sectional view, this is represented by oblique cross-hatched lines.

Part of the core 10 is enclosed by a shielding plate 31.

Figure 2B:
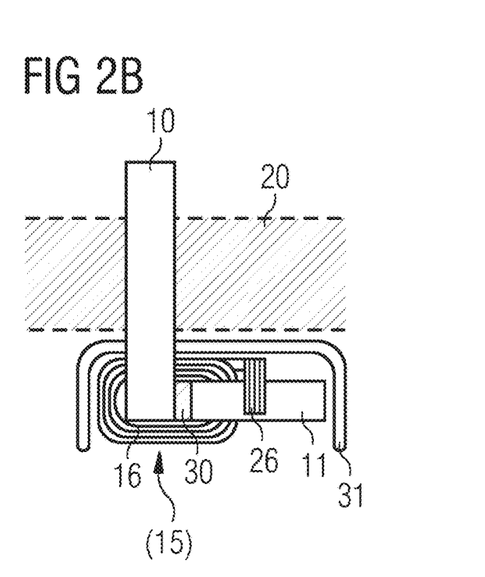

FIG. 2b shows a side view of the energy converter according to FIG. 2a, with a distinction in that details below the shielding plate 31 are represented. A proportion of the core 10, or a core section, is enclosed by a secondary winding 15. This can comprise, for example, a coil former 16, onto which the secondary winding 15 is wound or fitted. This provides a particular advantage, in that it permits a simple assembly of the energy converter.

The secondary winding 15 not only encloses a core section of the core 10, but also a proportion of the inductor core 11 according to an embodiment of the invention, or a core section of the inductor core 11.

The core 10 and the inductor core 11 are insulated from one another by way of a spacer element 30. Specifically, a core limb of the inductor core 10 is arranged parallel to a core limb of the core 10. The primary planes of both cores, i.e. the core planes having the greatest surface area, are arranged, for example, at right-angles, or perpendicularly to one another. Specifically, the primary plane of the inductor core can be arranged parallel to the primary conductor which constitutes the primary winding, specifically to the direction of extension thereof, for example the longitudinal direction and/or the primary plane, of the primary conductor, as represented in FIG. 2b.

The inductor core can be constituted as a one-piece, two-piece or multi-piece core, which is specifically held together by way of clamping or retaining lugs 26.

The shielding plate 31 is not configured with a closed circumference, but can be configured in a U-shape, a C-shape, a plate shape or a similar shape, as indicated, for example, in FIG. 2b.

The shielding plate 31 encloses, for example, the secondary winding 15, the inductor core 11 and at least part of the core limb of the core 10.

Figure 2C:
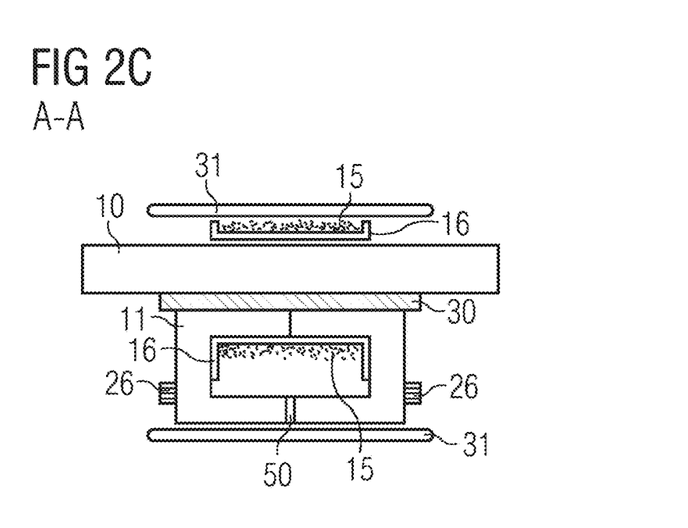

An underside view is represented in FIG. 2c. An exemplary position of the clamping or retaining lugs 26 can be seen. Moreover, the inductor core 11 is configured in a rectangular two-part U/U-shape, which is held together by the clamping or retaining lugs 26.

The inductor core 11 is preferably conceivable as a divided or single-part annular core, a rectangular core, a U/U, U/I, E/E, E/I or similar core; i.e. it preferably incorporates at least one central opening, through which specifically at least a part or a partial section of the secondary winding is routed.

The inductor core can further comprise at least one air gap 50.

Figure 3A:
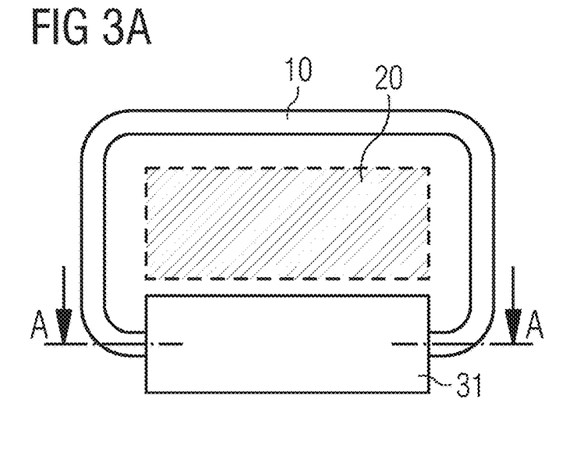
Figure 3B:
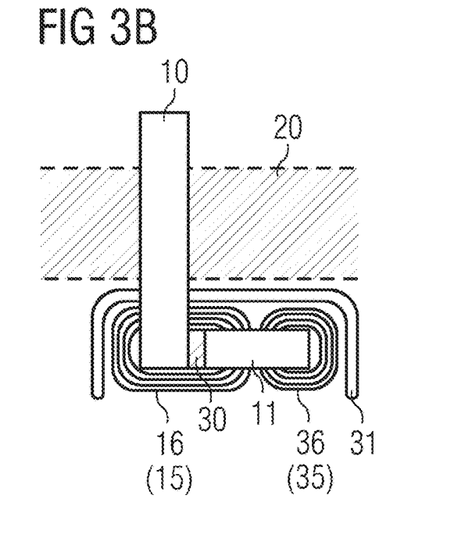
Figure 3C:
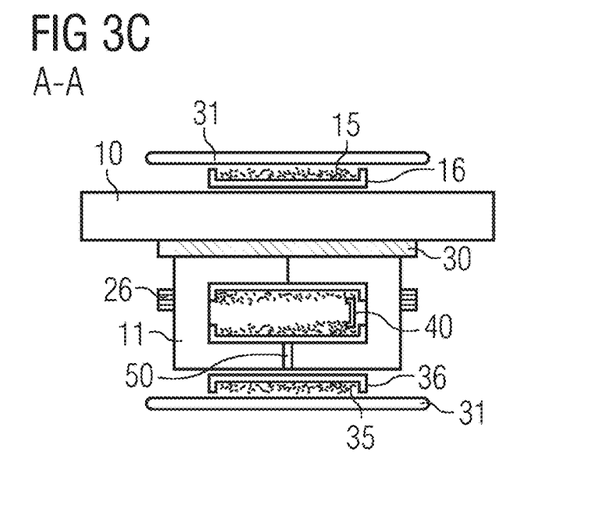

FIG. 3 shows a configuration according to FIG. 2, with a distinction in that the secondary winding comprises a first 15 and a second winding 35.

The first winding 15 encloses both the core 10 and the inductor core 11. The second winding 35 encloses only the inductor core 11.

For example, the first winding 15, in addition to the core 10, encloses a first section or limb of the inductor core 11 which is adjacent, for example, to the energy converter core 10. The second winding 35 encloses only the inductor core, for example another limb of the inductor core, for example a section or limb of the inductor core with is remote from the energy converter core 10.

The two windings are mutually connected, for example by way of a connecting line 40.

The second winding 35 can be arranged on a further or second coil former 36. This facilitates industrial production and assembly.

Here again, the inductor core incorporates an air gap 50.

Figure 4:
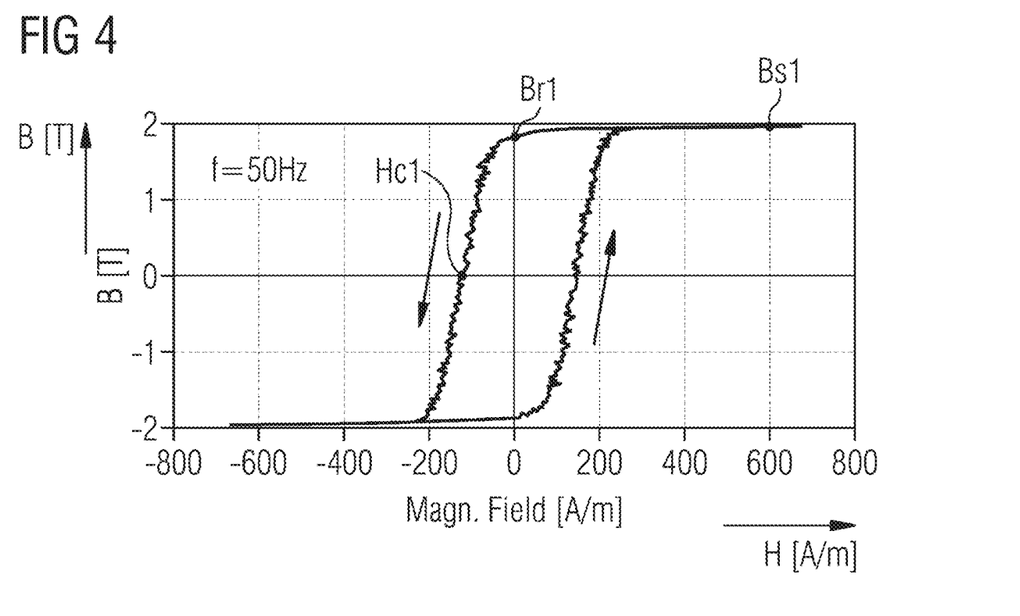
FIG. 4 shows a first diagram of a first hysteresis curve.

FIG. 4 shows a diagram of a first magnetic hysteresis curve, for example for a wound FeSi strip-wound annular core. The magnetic field strength H in A/m (amperes per meter) is plotted on the horizontal x-axis. The magnetic flux B in T (teslas) is plotted on the vertical y-axis. A typical hysteresis is plotted, which will be familiar to a person skilled in the art. This type of curve is also described as a "z-curve". Key properties of the material, which are characteristically identified in the curve, are the magnetic saturation flux density Bs1, the remanent flux density Br1, also simply described as the remanence in many cases, and the coercive field strength Hc1.

If a ferromagnetic core is wound with an electric primary winding or primary coil, and a current is passed through the electrical conductor of the primary winding, the resulting magnetic field H [A/m] generates a magnetic flux B [T] in the core. The winding can also be comprised of only a single turn, or a conductor can be routed through an (annular) core, by way of a "half turn", in order to generate a magnetic flux in the core.

This magnetic flux increases according to an increasing magnetic field or an increasing magnetic field strength. However, this can cannot proceed indefinitely, but only up to the "saturation flux density" Bs1. Once this is achieved, an increase in the magnetic field strength H will not result in an increase in the magnetic flux B in the core. This flux remains constant at the saturation flux density Bs1. In FIG. 1, this is indicated by the upward arrow represented next to the right-hand section of the characteristic curve.

If the magnetic field H is reduced back down to a value of zero (H=0 A/m), a magnetic flux Br1 nevertheless remains in the core. This is described as the remanent flux density Br1.

Only upon the application of an inversely oriented magnetic field (with a negative magnetic field strength in FIG. 1) can the magnetic flux in the core be restored to a value of zero (B=0 T). The magnetic field strength Hc1 required for this purpose is described as the coercive field strength Hc1. In FIG. 1 this is indicated by the downward arrow represented next to the left-hand section of the characteristic curve.

The remanent magnetic flux in the core Br1 of the energy converter is problematic. According to the invention, the core, in one configuration, should show the smallest possible remanence. In one configuration according to the invention, this is achieved by way of a nanocrystalline core by way of an energy converter.

Nanocrystalline strips of ferromagnetic materials are produced by the rapid solidification of a melt charge on a rotating disk or roller to constitute an amorphous strip, and the specific thermal and magnetic post-treatment of the wound-on amorphous strip.

Thermal post-treatment of the strip (an annealing process) results in recrystallization within the strip. Nanocrystals with ferromagnetic properties are constituted. If this recrystallization process is executed under the influence of an external magnetic field, the easy axis of magnetization in the constitution of nanocrystals will then be oriented in the magnetic field direction. Once the wound-on nanocrystalline strip has cooled, a ferromagnetic core is produced with a very high permeability and very narrow magnetic hysteresis, i.e. a very low magnetic power loss. Magnetic cores and current converters of this type can be operated up to the MHz frequency range.

Figure 5:
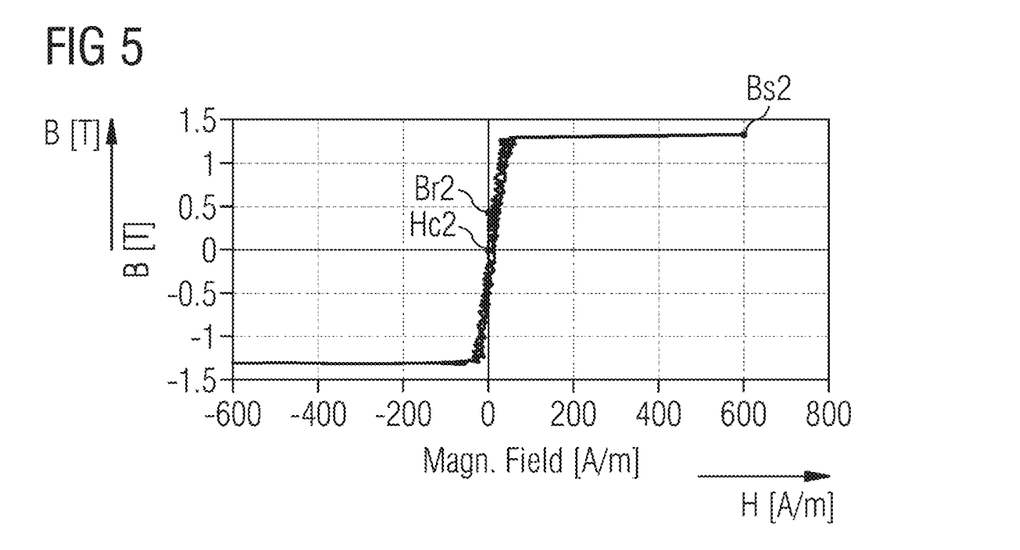
FIG. 5 shows a second diagram of a second hysteresis curve.

The hysteresis curve of a core of this type is represented in FIG. 5. FIG. 5 shows a diagram according to FIG. 4, with a distinction in that a magnetic hysteresis curve, for example for a nanocrystalline strip-wound annular core, specifically with transverse anisotropy, is represented. This curve is characterized by a much smaller residual flux density Br2 and a much smaller coercive field strength Hc2.

The magnetic saturation flux density Bs2 is approximately of the same magnitude as that represented in FIG. 4.

The curve assumes an "F-shape" ("F" for "flat").

For application as an energy converter in circuit breakers for the supply of energy to a control unit ETU, i.e. as a magnetically coupled standalone power supply for the electronic trip unit in the circuit breaker, the relatively high saturation polarization of 1.2 T (at least 1 T) and the very high permeability are particularly advantageous. The lower magnetic core losses are particularly advantageous in power networks which are affected by a high harmonic current component, to which circuit breakers are increasingly exposed at present, as grain-oriented electrical steel plate shows very high magnetic power losses at high frequencies.

As described above, the magnetic orientation in the strip-wound core is influenced by the magnetic field during recrystallization. If the magnetic field assumes an annular orientation around the mid-point of the annular core, a resulting longitudinal magnetic anisotropy is produced in the nanocrystalline strip. Annular cores of this type show an extremely high permeability, but also a magnetic hysteresis with a highly pronounced z-shape. Cores of this type therefore show a pronounced remanent magnetic flux.

If, conversely, the external magnetic field is uniformly oriented in parallel with the annular core axis, then transverse magnetic anisotropy will occur during recrystallization. Annular cores of this type comprised of a nanocrystalline strip material show virtually no remanent magnetic flux given that, in the absence of an external magnetic field, the magnetic polarization of the nanocrystals is oriented perpendicularly to the annular circumference. The magnetic hysteresis assumes an F-shape, as represented in FIG. 5. Cores of this type nevertheless show a permeability, which is comparable to that of conventional electrical steel plate, wherein, additionally, the magnetic power loss in the nanocrystalline strip-wound annular core is a lot smaller.

Nanocrystalline annular cores of this type, with a comparable magnetic core cross-section, can replace wound annular cores of grain-oriented electrical steel plate, which is specifically advantageous for circuit breakers, specifically for compact or open circuit breakers.

In an embodiment of the invention, a circuit breaker can be produced with a comparatively small energy converter, even in networks which are affected by a harmonic component and at high primary currents, which exceed the specified currents, wherein a reliable energy supply for a control unit is provided.

By way of a core of a nanocrystalline strip material, the following advantages can be achieved in the context of the invention:

Very high permeability;
High magnetic saturation polarization;
Significantly smaller structural size than that of annular cores of a ferrite material, with equal apparent power;
Suitability for typical network frequencies.
Similar structural size to cores of electrical steel plate, with equal apparent power;
Simplicity of replacement in existing designs.
Very narrow magnetic hysteresis, i.e. low magnetic power losses;
Suitability for high frequencies;
Suitability for networks affected by a high harmonic current component.

The following advantages further proceed from the adjustable magnetic anisotropy during the recrystallization process:

A very low remanent magnetic flux associated with transverse magnetic anisotropy;
No remanence effect;
Immediate trip capability of a control unit, e.g. an ETU, in the circuit breaker, regardless of the "previous history" of the preceding switch-off/tripping of the circuit breaker.

Configurations of embodiments of the invention are further elucidated hereinafter.

In an energy or current converter, a core 10 is arranged around the primary electrical conductor 20. This core should show a high permeability under low activation conditions and/or a narrow hysteresis for the minimization of magnetic reversal losses.

Specifically, a core 10, in which:
a) The remanent flux density $B_{r2}$ is smaller than 30% or smaller than 20% of the saturation flux density $B_{s2}$, or
b) The coercive field strength $H_{c2}$ is smaller than 10 A/m, or smaller than 5 A/m, is preferred and appropriate for this purpose.

An alternative is a core 10, the saturation flux density $B_{s2}$ of which is at least 1 T, and specifically at least 1.2 T.

An alternative is a ferromagnetic core 10 of a nanocrystalline material, specifically a nanocrystalline strip-wound core.

A material of this type can also be employed for the inductor core.

The magnetic circuit of the current-limiting inductor 11 is preferably comprised of a ferromagnetic powder, such as e.g. a Fe-, Fe/Ni-alloy or ferrite powder. It is configured, for example, in a U/U or U/I shape. In addition to the (primary) magnetic core 10, the secondary winding 15 of the current converter also encloses the magnetic inductor core 11. The two magnetic cores are preferably configured in an electrically and/or magnetically insulated arrangement in relation to one another. This is achieved, for example, by way of an insulating, e.g. an electrically insulating and/or non-magnetic spacer element or disk 30, with an appropriate external shape. The spacer element or disk 30, and the e.g. two half-cores of the inductor core 11, further to the production of the secondary coil, can be inserted e.g. in the coil former 16. The e.g. half-cores are e.g. mechanically clamped together, e.g. by way of structurally-integrated clamping/retaining lugs 26 on the coil former.

In this design, the secondary winding of the current converter also functions as an inductor winding, by way of the second magnetic inductor core 11. Consequently, the above-mentioned voltage spike associated with the current-limiting inductor does not occur outside the secondary winding 15. Although higher induced voltages within the secondary winding must be anticipated, these are distributed along the secondary winding 15. Consequently, the potential gradient between two adjoining wire turns can be recovered, e.g. by way of an appropriate wire insulation.

The electrically insulating spacer element or plate 30 prevents electric Eddy currents within or over the cross-section of said plate 30. The spacer element or plate thickness, and the property whereby the latter is constituted of a non-magnetic material, prevent any stray magnetic flux between the two cores. This specifically includes electric Eddy currents above, e.g. in the perpendicular, associated magnetic field components originating from the cores.

Ideally, e.g. the (primary) core 10 and the inductor core 11 are arranged perpendicularly to one another, i.e. the inductor core 11 is arranged e.g. parallel to the primary conductor 20. It is thus achieved that the magnetic field of the primary conductor 20 exerts a uniform action on the inductor core 11, and induces the least possible additional power in the secondary circuit. An e.g. magnetic shielding plate 31 arranged between the primary conductor and the inductor core further reduces e.g. the magnetic field strength of the primary conductor in the region of the inductor core. This shielding plate 31 is not continuous, but occupies only the region between the primary conductor and the secondary coil, e.g. by way of a plate or a U-section.

Both these measures are independently intended to ensure the functionality of the current-limiting inductor, up to the region of the maximum primary short-circuit currents.

The division of the secondary winding into a first (existing) and a second winding 35 is associated with advantageous further developments. Existing features are thus maintained, such as e.g.:

an optimized current converter arranged around the primary electric conductor 20, a clamped two-part inductor core 11 comprised of a powdered material, a secondary winding 15 which encloses the (primary) core 10 and the inductor core 11, an electrically- and magnetically-insulating spacer plate 30 arranged between the two cores, a perpendicular arrangement of the two magnetic cores, a magnetic shielding plate 31 arranged between the primary conductor and the inductor core.

Previously, the inductance of the inductor has been adjusted by way of the magnetic properties of the inductor core 11, such as the magnetic cross-section thereof. The number of turns on the secondary winding is dictated by the requirements of the current converter or the control unit ETU. The magnetic cross-section and permeability must be dimensioned such that the inductor core 11, under all operating conditions, operates in the linear region below magnetic saturation.

As the number of turns is quadratically related to the inductance, the resulting number of turns on the inductor is generally greater than would be desirable for the current converter, in order to achieve effective current limitation in the overall design.

Optimized dimensioning of the current-limiting inductor is achieved according to the invention where a (supplementary) second winding 35 is arranged above a free region of the inductor core, e.g. having no contact with the (primary) core 10.

The winding direction of the second winding 35 constitutes a continuation e.g. of the winding direction of the first winding 15 along the magnetic core length in the inductor circuit. This results in a higher overall number of turns in the inductor, and thus a higher inductance, together with the optimized dimensioning of the overall design.

By the resulting division of the inductor inductance, a proportion of the counter-EMF is detectable on the connection point between the two windings. The height of the voltage spike is dictated by the ratio of the two inductance components, and is thus smaller than in the event of the complete separation of the current converter and the inductor. Moreover, the position of the voltage spike is locally restricted between the two windings, as a result of which the consideration of the clearance in air and the creepage distance are simplified.

The reactance of the inductor in a series circuit arrangement between the energy or current converter (power source) and the control unit ETU (power sink) compensates the capacity mismatch between the source and the sink. This results in the following advantages, some of which have already been mentioned:

Surplus power on the secondary side is not converted into heat the thermal design is considerably simplified, energy efficiency is improved.

The design functions at various frequencies, as the secondary voltage from the current converter, which rises in a linear relationship with frequency, coincides with a reactance from the inductor, which rises in a linear relationship with frequency.

The secondary current is limited by the reactance. All the components of the supply circuit within the control unit ETU (e.g. rectifier diodes, electronic bypass, etc.) can be rated for these lower currents.

This generates savings in both costs and space.

Voltage spikes are prevented, or are significantly reduced by the integrated concept envisaged according to the invention. The electrical hazard potential is significantly reduced as a result.

A critical further development according to the invention involves the complete mechanical isolation of the two magnetic circuits/cores of the energy/current converter and the inductor, specifically by way of the spacer element/plate 30.

This gives rise to the following advantages:

Prevention of (stray) magnetic fluxes between the two circuits/cores.
  no additional Eddy currents associated with perpendicular magnetic flux components,
  no inordinately excessive heat-up associated with current harmonics.

Clear distinction in the dimensioning of the current converter and the inductor.

The selection of a powdered magnetic material, e.g. Fe-, Fe/Ni-alloy or ferrite powder, for the inductor core simplifies the structural design, given that, for example, an air gap in a highly permeable inductor core can be omitted.

The current-limiting action of the inductor is ensured up to very high primary currents, specifically by the perpendicular arrangement of the two magnetic cores in relation to one another. Specifically, this further proceeds from the parallel orientation of the inductor core to the primary electrical conductor. A further improvement of the invention, with respect to the negative influence of very strong magnetic fields around the primary conductor, is achieved by way of the shielding plate, specifically a magnetic shielding plate, between the primary conductor and the coil arrangement.

Although the invention has been illustrated and described in greater detail with reference to the exemplary embodiment, the invention is not limited to the examples disclosed, and further variations can be inferred herefrom by a person skilled in the art, without departing from the protective scope of the invention.

The invention claimed is:

1. A circuit breaker for interrupting an electric power circuit when at least one of current and current time period thresholds are exceeded, the circuit breaker comprising:
  at least one control unit, energy being supplied to the at least one control unit via an energy converter;
    a primary winding of the energy converter being constituted by a conductor of the electric power circuit,
    a core of the energy converter enclosing the conductor of the electric power circuit, to function as a primary winding, and
    a secondary winding of the energy converter enclosing a section of the core and
    additionally enclosing an inductor core,
    arranged relative to the core via an insulating spacer element,
  wherein the secondary winding and the inductor core are at least partially magnetically shielded from the primary winding by a shielding plate, routed through the core.

2. The circuit breaker of claim 1, wherein the shielding plate partially encloses the secondary winding and the inductor core, and is specifically configured as a U-shaped profile section or plate.

3. The circuit breaker of claim 2, wherein the inductor core incorporates a central opening, at least a part of the secondary winding being routed through the central opening.

4. The circuit breaker of claim 1, wherein the inductor core incorporates a central opening, at least a part of the secondary winding being routed through the central opening.

5. The circuit breaker of claim 1, wherein the inductor core is configured as a two-part or multi-part core, a clamping device being configured to hold the two-part or multi-part core together.

6. The circuit breaker of claim 1, wherein the inductor core is arranged at least one of parallel to the primary winding and perpendicular to the core.

7. The circuit breaker of claim 1, wherein the secondary winding is arranged on a coil former.

8. The circuit breaker of claim 1, wherein the secondary winding includes a first winding and a second winding, spatially separated from one another and respectively arranged on a first coil former and a second coil former.

9. The circuit breaker of claim 8, wherein the second winding encloses a second region of the inductor core, relatively further removed from the core than a region of the first winding.

10. The circuit breaker of claim 9, wherein a winding direction of the second winding is a continuation of a winding direction of the first winding of the secondary winding along a magnetic core length of the inductor core.

11. The circuit breaker of claim 8, wherein a winding direction of the second winding is a continuation of a winding direction of the first winding of the secondary winding along a magnetic core length of the inductor core.

12. The circuit breaker of claim 1, wherein the energy converter comprises a core:
 a) a remanent flux density of the core being less than 30% or less than 20% of a saturation flux density of the core, or
 b) a coercive field strength of the core being less than 10 A/m or less than 5 A/m.

13. The circuit breaker of claim 1, wherein the energy converter comprises a core, a saturation flux density the core being at least 1 T.

14. The circuit breaker of claim 1, wherein the energy converter comprises a ferromagnetic core of a nanocrystalline material.

15. The circuit breaker of claim 1, wherein the inductor core is at least partially constituted of a ferromagnetic powder.

16. The circuit breaker of claim 15, wherein the inductor core is at least partially constituted of a Fe-, Fe/Ni-alloy or ferrite powder.

17. The circuit breaker of claim 1, wherein the shielding plate is comprised of Fe, Ni or Co, or is specifically an alloy containing at least one of the elements Fe, Ni or Co.

18. The circuit breaker of claim 1, wherein the insulating spacer element is electrically insulating, and specifically is comprised of plastic, ceramic, glass or laminated paper/card.

19. An energy converter for the circuit breaker of claim 1.

20. An inductor for the circuit breaker of claim 1.

21. The circuit breaker of claim 1, wherein the inductor core incorporates an air gap.

22. The circuit breaker of claim 1, wherein the energy converter comprises a core, a saturation flux density the core being at least 1.2 T.

23. The circuit breaker of claim 1, wherein the energy converter comprises a nanocrystalline strip-wound core.

* * * * *